US010440668B1

(12) United States Patent
Wu (10) Patent No.: US 10,440,668 B1
(45) Date of Patent: Oct. 8, 2019

(54) VEHICLE PLATOONING MANAGEMENT AND POWER CONTROL WITH LTE/5G V2X COMMUNICATIONS (71) Applicant: FORD GLOBAL TECHNOLOGIES, LLC, Dearborn, MI (US)

(72) Inventor: Tao Wu, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/183,318

(22) Filed: Nov. 7, 2018

(51) Int. Cl.
*H04W 52/38* (2009.01)
*H04W 4/08* (2009.01)
*H04W 52/10* (2009.01)
*H04W 4/46* (2018.01)
*H04W 4/44* (2018.01)

(52) U.S. Cl.
CPC .......... *H04W 52/386* (2013.01); *H04W 4/08* (2013.01); *H04W 4/44* (2018.02); *H04W 4/46* (2018.02); *H04W 52/10* (2013.01)

(58) Field of Classification Search
CPC .......... H04W 4/46; H04W 4/08; H04W 4/44; H04W 52/10; H04W 52/386
See application file for complete search history.

(56) References Cited

U.S. PATENT DOCUMENTS

| 2012/0158820 | A1* | 6/2012 | Bai | G07C 5/008 709/202 |
| 2014/0316865 | A1* | 10/2014 | Okamoto | G08G 1/22 705/14.1 |
| 2017/0293296 | A1* | 10/2017 | Stenneth | G01C 21/3438 |
| 2018/0146471 | A1* | 5/2018 | Xu | H04W 4/44 |
| 2019/0035284 | A1* | 1/2019 | Tam | G08G 1/22 |
| 2019/0110325 | A1* | 4/2019 | Gulati | H04W 76/14 |

FOREIGN PATENT DOCUMENTS

| GB | 2557434 A * | 6/2018 | .......... G05D 1/0005 |
| WO | WO-2014072849 A1 * | 5/2014 | .......... H04W 40/20 |
| WO | 2017198302 A1 | 11/2017 | |
| WO | 2018106774 A1 | 6/2018 | |

* cited by examiner

Primary Examiner — Keith Ferguson
(74) Attorney, Agent, or Firm — Michael J. Spenner; Brooks Kushman P.C.

(57) ABSTRACT

A platoon server is in communication with a plurality of vehicles. The platoon server is programmed to receive a platoon request from a platoon candidate vehicle, the request including platoon data indicative of size, transmit power, and location of the candidate vehicle, admit the candidate vehicle to be a member vehicle of the platoon, and update which member vehicle of the platoon is platoon beacon based upon platoon data of each member vehicle of the platoon.

18 Claims, 5 Drawing Sheets

VEHICLE PLATOONING MANAGEMENT AND POWER CONTROL WITH LTE/5G V2X COMMUNICATIONS

TECHNICAL FIELD

Aspects of the disclosure generally relate to vehicle platoon management and power control using LTE/5G V2X communications.

BACKGROUND

Vehicle-to-vehicle (V2V) communication refers to the wireless transmission of data between motor vehicles. V2V communications may be used for various purposes, including allowing vehicles to send messages to one another including status information regarding the operation of the vehicle. This information may include, for example, speed, location, direction of travel, braking, and stability data.

SUMMARY

In one or more illustrative examples, a system includes a platoon server in communication with a plurality of vehicles, programmed to receive a platoon request from a platoon candidate vehicle, the request including platoon data indicative of size, transmit power, and location of the candidate vehicle, admit the candidate vehicle to be a member vehicle of the platoon, and update which member vehicle of the platoon is platoon beacon based upon platoon data of each member vehicle of the platoon.

In one or more illustrative examples, a method for a vehicle includes, responsive to sending, to a platoon server, a platoon request including platoon data specifying size, transmit power, and location of the vehicle, receiving a join message from the server specifying a platoon beacon of the platoon, the platoon beacon being recalculated by the server responsive to the platoon request; and responsive to receiving the join message, sending a message to the platoon beacon requesting admission to the platoon.

In one or more illustrative examples, a non-transitory computer-readable medium comprising instructions that, when executed by a platoon server, cause the platoon server to receive a platoon request from a platoon candidate vehicle, the request including platoon data indicative of size, transmit power, and location of the candidate vehicle; admit the candidate vehicle to be a member vehicle of the platoon; and update which member vehicle of the platoon is platoon beacon based upon platoon data of each member vehicle of the platoon.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle platooning is an essential step toward autonomous driving and considered one of the major use cases in 5G systems. In a wireless communication system over licensed frequency band, transmit power control and interference mitigation become critical in terms of signal performance and system capacity. In some systems, the first vehicle in a platoon is designated as the platoon leader or platoon beacon (PB), which as platoon beacon has the responsibility to effectively communicate Cooperative Awareness Messages (CAMs) with all platoon members (PMs). With a long platoon size, this demands a high transmit power on PL and for some PMs to maintain a certain level of signal-to-noise ratio at the receiver. This high transmit power may subsequently generate excessive interference to surrounding vehicles and reduces the efficiency of frequency reuse, especially in a congested scenario.

Furthermore, a vehicle platoon is not necessary only for homogeneous vehicles, such as truck platooning in the initial applications, but could also consist of heterogeneous fleets of vehicles with different size and RF transmission capabilities.

When multiple platoons exist in the same area, interference management becomes even more complicated. When two platoons are traveling in neighboring or opposite lanes, signals from one platoon could severely interfere with the transmission and reception of the other platoon if they are using the same frequency band. A distributed control method is insufficient to address the issue.

Therefore, an effective centralized power control and interference management mechanism is desired for advanced vehicle platooning in 4G/LTE as well as 5G/NR systems for enhanced platoon management, system capacity, and road safety.

This disclosure proposes a control and communication mechanism for effective management and coordination of multiple platoons within a certain geographic area using the cellular (LTE/5G) V2X technologies, where delay tolerant control signaling, such as open loop power control parameters, goes through the LTE eNB over Uu interface, including common and dedicated messages, and the delay sensitive data transmission goes over the sidelink (PC5) among vehicles as C-V2V (mode 4) with either Rel 14 LTE or Rel 15/16 5G New Radio (shorter TTI) for ultra-low latency and ultra-reliable communications.

Furthermore, this disclosure introduces a novel platoon structure where a platoon beacon is dynamically appointed by a base station based on various considerations including, but not limited to transmit power, interference applied, vehicle type/size (LOS blockage), vehicle capability, and planned route, in order to achieve optimal performance in terms of traffic efficiency and safety. A parameter of transmit power control is computed at the cloud platoon server based on the above factors and is sent to PB as part of the open loop power control.

Figure 1:
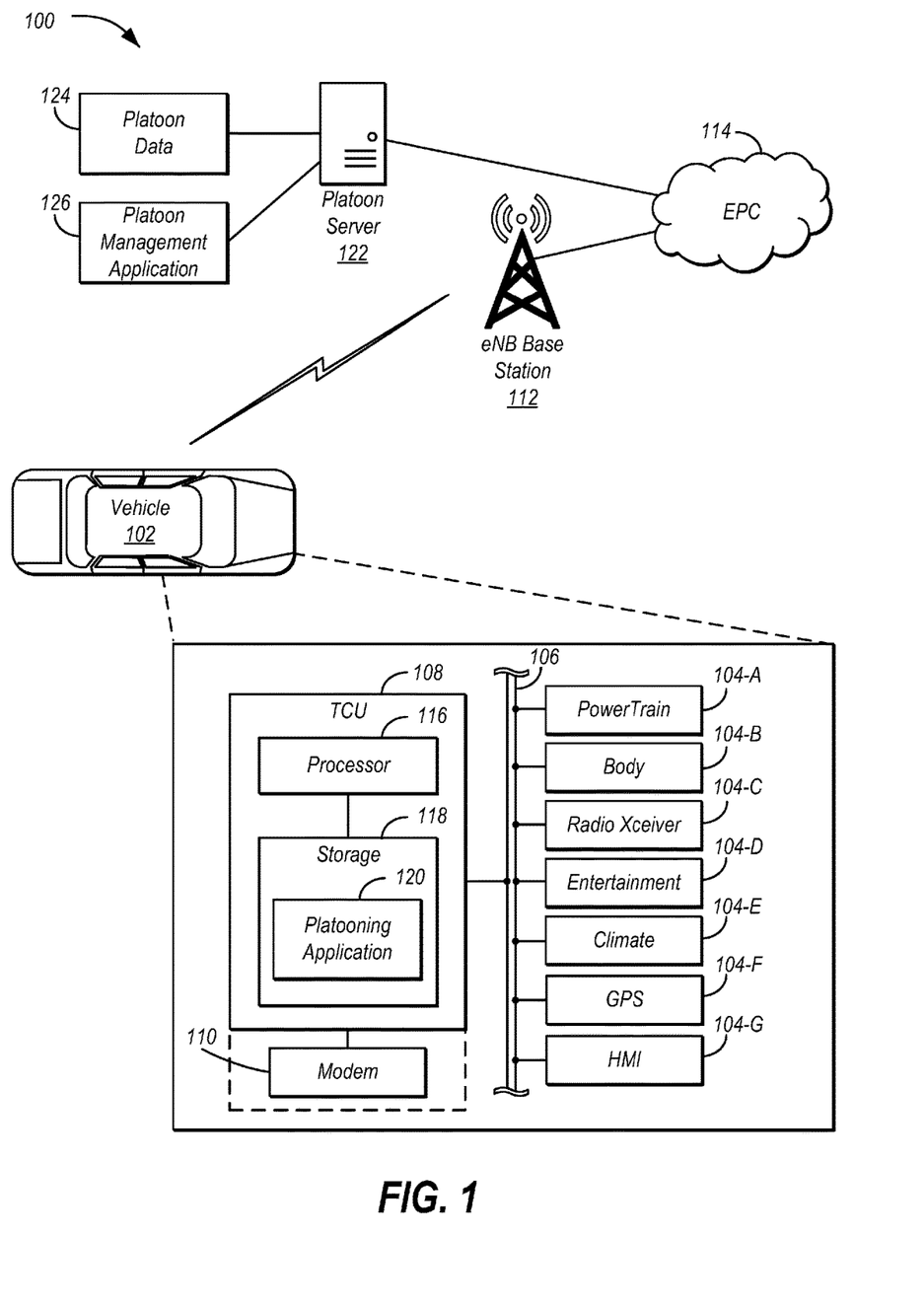
FIG. 1 illustrates an example system including a vehicle configured for use in platooning systems.

FIG. 1 illustrates an example system 100 including a vehicle 102 configured for use in platooning systems. As illustrated, the vehicle 102 includes a plurality of vehicle controllers 104 in communication over one or more vehicle buses 106. The vehicle 102 further includes a telematics control unit (TCU) 108 configured to send and receive data to networked devices connected to the 3GPP network. The TCU 108 may utilize a platoon application 120 installed to the TCU 108 to send and receive data over the 3GPP network. The TCU 108 may also use the platoon application 120 to send and receive data between vehicles 102, without using the 3GPP network. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors, and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle controllers 104, as well as between the TCU 108 and the vehicle controllers 104. As some non-limiting examples, the vehicle bus 106 may include one or more of a vehicle controller area network (CAN), an Ethernet network, or a media-oriented system transfer (MOST) network. Further aspects of the layout and number of vehicle buses 106 are discussed in further detail below.

The TCU 108 may include network hardware configured to facilitate connectivity between the vehicle controllers 104 and devices connected to an outside network. To do so, the TCU 108 may include or otherwise access a cellular modem 110. (E.g., in some cases the modem 110 is internal to the TCU 108 while in other cases the modem 110 is external to the TCU 108.) As shown, a portion of a LTE network architecture is illustrated which may be referred to as an Evolved Packet System (EPS). The EPS may include an Evolved UMTS Terrestrial Radio Access Network (E-UTRAN), an Evolved Packet Core (EPC) 114, a Home Subscriber Server (HSS), or an Operator's IP Services. The EPS can interconnect with other access networks.

The E-UTRAN includes an evolved Node B (eNB) 112 which may be an example of a serving base station that serves the modem 110. The E-UTRAN also includes other eNBs 112 (not shown). The eNB 112 can provide user and control planes protocol terminations toward the modem 110. The eNB 112 may be connected to the other eNBs 112 via a backhaul (e.g., an X2 interface). The eNB 112 and other eNBs 112 may also be referred to as a base station, a base transceiver station, a radio base station, a radio transceiver, a transceiver function, a basic service set (BSS), an extended service set (ESS), or some other suitable terminology. The eNB 112 can provide an access point to the EPC 114 for the modem 110. The modem 110 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an user equipment, a mobile terminal, a wireless terminal, a remote terminal, a handset, a user agent, a mobile client, a client, or some other suitable terminology.

The eNB 112 is connected by an S1 interface to the EPC 114. The EPC 114 includes elements such as a Mobility Management Entity (MME), other MMEs, a Serving, and a Packet Data Network (PDN) Gateway. The MME is the control node that processes the signaling between the modem 110 and the EPC 114. Generally, the MME provides bearer and connection management. All user IP packets can be transferred through the Serving Gateway, which itself is connected to the PDN Gateway. The PDN Gateway can provide UE IP address allocation as well as other functions. The PDN Gateway is connected to the Operator's IP Services. The Operator's IP Services may include the Internet, the Intranet, an IP Multimedia Subsystem (IMS), and a PS Streaming Service (PSS).

The TCU 108 may further include various types of computing apparatus in support of performance of the functions of the TCU 108 described herein. In an example, the TCU 108 may include one or more processors 116 configured to execute computer instructions, and a storage 118 medium on which the computer-executable instructions and/or data may be maintained. A computer-readable storage medium (also referred to as a processor-readable medium or storage 118) includes any non-transitory (e.g., tangible) medium that participates in providing data (e.g., instructions) that may be read by a computer (e.g., by the processor(s)). In general, the processor 116 receives instructions and/or data, e.g., from the storage 118, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of vehicle location data and/or other vehicle information from the vehicle controllers 104 connected to the one or more vehicle buses 106.

The platoon application 120 may be one application included on the storage 118 of the TCU 108. The platoon application 120 may include instructions that, when executed by the processor 116 of the TCU 108 allow the vehicle 102 to communicate data via the EPC 114. In an example, this communication may include use of the Uu interface to communicate with the LTE eNB base station 112. The platoon application 120 may include instructions that, when executed by the processor 116 of the TCU 108 allow the vehicle 102 to communicate data via V2X communication. In an example, this communication may include use of the PC5 interface. In an example, the platoon application 120 may communicate platoon data 124 to the platoon server 122, and may communicate vehicle 102 location and speed information (e.g., identified via the GPS controller 104-F) to other vehicles 102 of a platoon.

The platoon server 122 may include various types of computing apparatus, such as a computer workstation, a server, a desktop computer, a virtual server instance executed by a mainframe server, or some other computing system and/or device. Similar to the TCU 108, the platoon server 122 generally includes a memory on which computer-executable instructions may be maintained, where the instructions may be executable by one or more processors (not shown for clarity). Such instructions and other data may be stored using a variety of computer-readable media. In an example, the platoon server 122 may be configured to maintain platoon data 124 and a platoon management application 126. It should be noted that while many examples discussed herein relate to the functionality of the platoon server 122, some or all of the described functionality of the platoon server 122 may alternately be performed by the LTE/5G eNB 112 utilizing the edge computing capabilities of the base station itself. For instance, an eNB 112 may at least initially assign a vehicle 102 as PB, although the platoon server 122 may do so in other examples to provide a broader coordination, albeit with the price of potentially-higher signaling latency.

The platoon data 124 may include information regarding the vehicles 102 that may be used to formulate platoons. In an example, platoon data 124 may be received from the TCUs 108 of the vehicles 102 by way of the eNB 112. Example platoon data 124 may include vehicle type or size (which may indicate line-of-sight blockage characteristics of the vehicle 102), vehicle capabilities (e.g., available wireless transceiver power levels, wireless protocols/standards supported by the vehicle 102, etc.), and planned route for the vehicle 102.

The platoon management application 126 includes instructions that, when executed by one or more processors of the platoon server 122, cause the platoon server 122 to manage the vehicles 102 of the platoon. This may include performing operations regarding receiving platoon data 124 from the vehicles 102, and the addition and removal of vehicles 102 from platoons. Further details of the operation of the platoon management application 126 are discussed below with regard to the operation of the platoon server 122 in FIG. 3.

Figure 2:
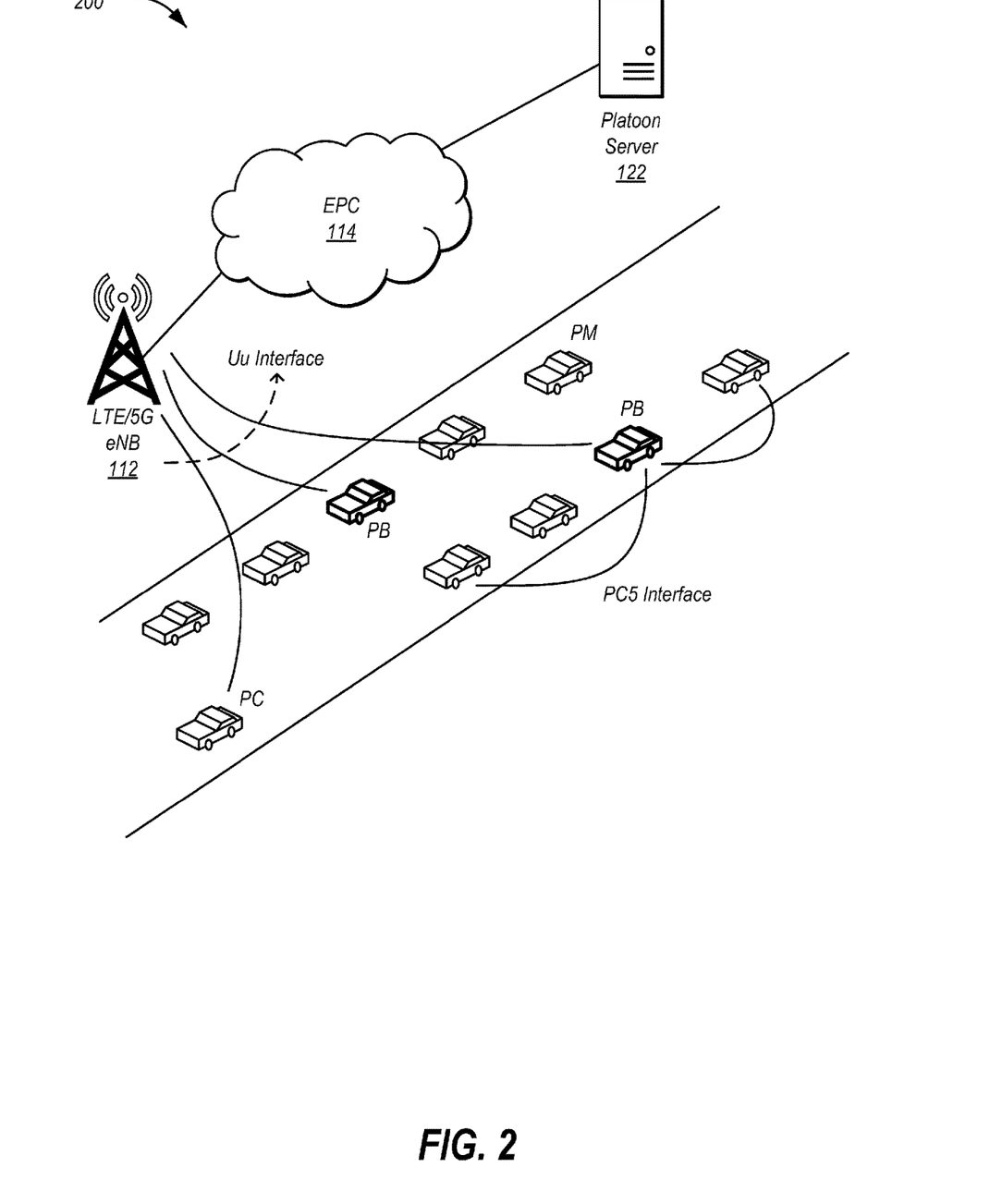
FIG. 2 illustrates a diagram of an LTE base station and a plurality of vehicles involved in a platoon.

FIG. 2 illustrates a diagram 200 of an LTE or 5G NR base station 112 and a plurality of vehicles 102 involved in a platoon. As demonstrated in the diagram 200, the LTE base station 112 manages various vehicles 102 to, for example, form a platoon, allocate the frequency resource, assign the open loop power control parameters, and associate the platoon candidate to the right platoon. The LTE base station 112 and the PB may communicate through a Uu interface, while the PB and Platoon Members (PMs) may communicate over a PC5 link. The eNB LTE base station 112 may be configured to allocate different frequency resources to different platoons travelling in adjacent areas. The eNB LTE base station 112 may also be configured to adjust the transmit power of PB and PMs in the platoon according to network congestion.

Figure 3:
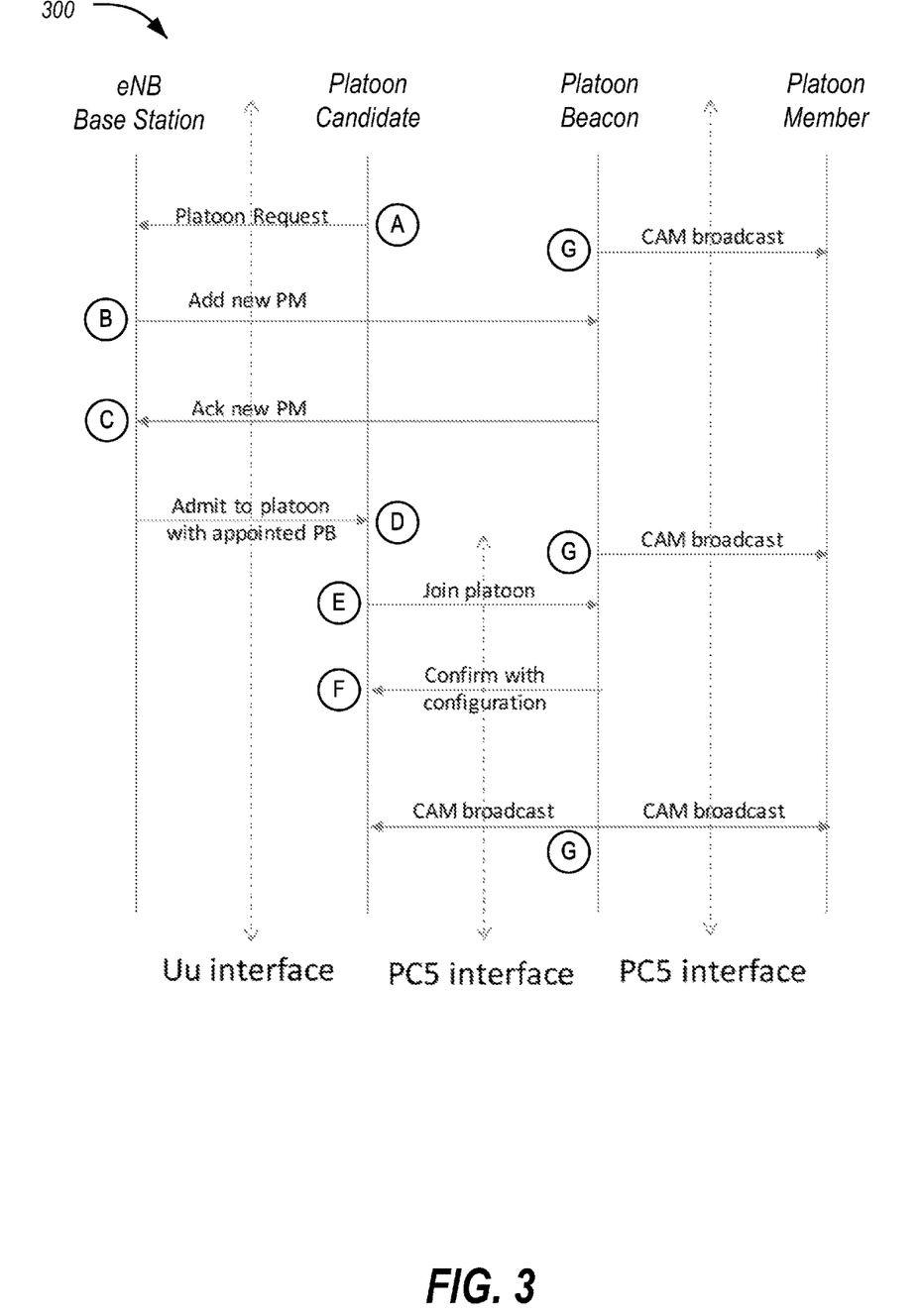
FIG. 3 illustrates an example signal flow for platoon admission process and periodic CAM broadcasting from a platoon beacon to all platoon members.

FIG. 3 illustrates an example signal flow 300 for a platoon admission process and periodic CAM broadcasting from PB to all PMs. The Platoon Beacon (PB) is a vehicle 102 that is configured to act as the leader of a platoon for Cooperative Awareness Message (CAM) exchange. Notably, as compared to other systems, the PB is not always selected as the first vehicle 102 at the front of a platoon. The optimal selection of PB is made possible by way of coordination from the eNB LTE base station 112 and the platoon server 122 via the EPC 114. The platoon server 122 may accordingly maintain network and other information, not only for the associated platoon, but also for neighboring platoons and surrounding vehicles 102.

More specifically, at index (A), a platoon candidate (PC) vehicle 102 sends a platoon request to the eNB LTE base station 112 via the Uu interface. At index (B), the eNB LTE base station 112 sends a message via the Uu interface to the PB vehicle 102 requesting the addition of the PC vehicle 102 to the platoon. At index (C), the eNB LTE base station 112 receives an acknowledgement message from the PB vehicle 102 via the Uu interface, acknowledging the addition of the PC vehicle 102 to the platoon. At index (D), the eNB LTE base station 112 sends an admission message to the PC vehicle 102 via the Uu interface, indicating to the PC vehicle 102 that it may be admitted to the platoon with the appointed PB vehicle 102. At index (E), the PC vehicle 102 sends a message over the PC5 interface to the PB vehicle 102 requesting to join the platoon. In an example, the request message may include platoon data 124 indicating the capabilities of the vehicle 102. At index (F), the PB vehicle 102 responds to the PC vehicle 102 over the PC5 interface with a confirmation that the PB vehicle 102 has joined the platoon. The confirmation message may further include information indicative of the configuration of the platoon. An example of the configuration information is described in further detail with respect to FIG. 7.

At indexes (G), the PB vehicle 102 periodically sends CAM broadcasts to the PM vehicles 102 of the platoon. For instance, before addition of the PC vehicle 102, the PB vehicle 102 periodically sends CAM broadcasts over the PC5 interface to PM members that do not include the PC vehicle 102, but after addition of the PC vehicle 102, the PC vehicle 102 is also a recipient of the CAM broadcasts to the PM vehicles 102 of the platoon.

Figure 4:
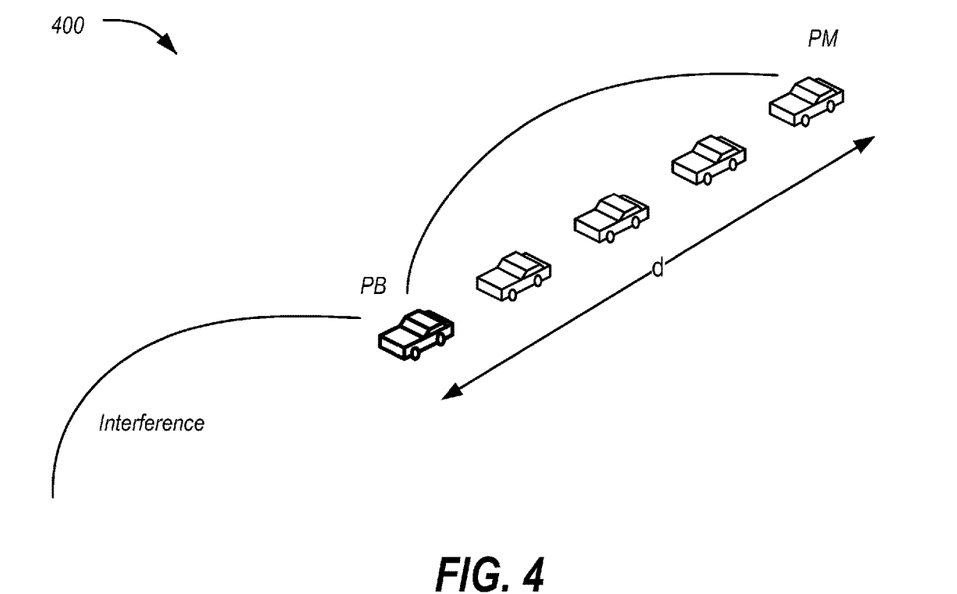
FIG. 4 illustrates an example diagram of a platoon as the baseline with length of d, where the first vehicle is acting as a platoon beacon by default.

FIG. 4 illustrates an example diagram 400 of a platoon as the baseline with length of d, where the first vehicle 102 is acting as a Platoon Beacon by default. Consider a simple free space line-of-sight (LOS) channel with no objects between the receiver and the transmitter. In such a situation, the transmitted signal attenuates as the energy is spread spherically around the transmitting antenna. Theoretically, the received power is given by equation (1):

$$Pr = Pt(\text{sqrt}(Gl) * \lambda / (4\pi * d))^2 \quad (1)$$

where
Pr is the received power,
Pt is the transmitted power,
Gl is the product of the transmit and receive antenna field radiation patterns,
$\lambda$ is the wavelength, and
d is the distance from the transmitter.
This shows that the power falls off in proportion to the square of the distance. In practice, the power falls off more rapidly, typically as a 3rd or 4th power of distance.

Figure 5:
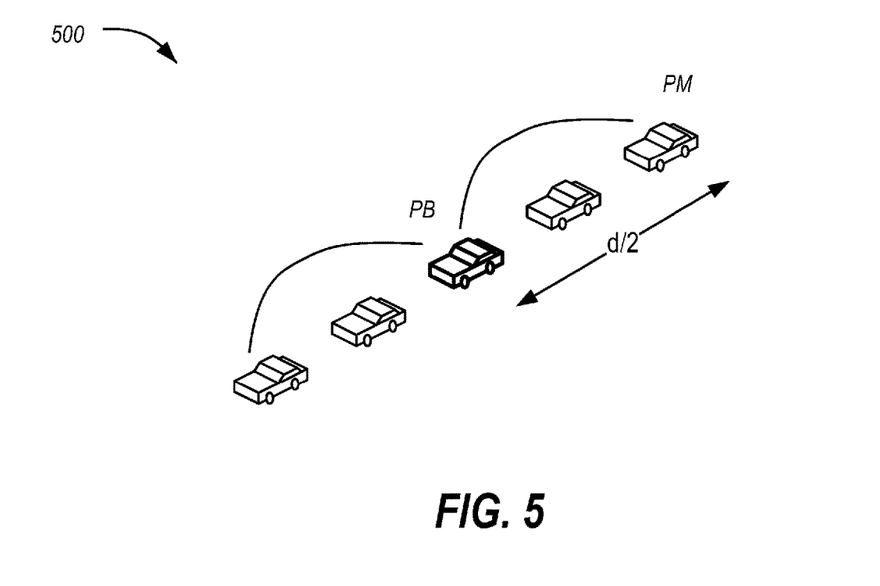
FIG. 5 illustrates an example diagram of a platoon, where a middle vehicle of the platoon is acting as the platoon beacon.

FIG. 5 illustrates an example diagram 500 of a platoon, where a middle vehicle 102 of the platoon is acting as the PB. As shown in the diagram 500, for a platoon with length d, when the PB vehicle 102 is located at the exact middle of the platoon, the maximum transmission range becomes d/2. According to the equation (1), path loss, or the corresponding transmit power that could have been saved, is approximately 6 dB. In practice, however, this reduction may be even larger, e.g., from 9 dB to 12 dB. This may result in a significant improvement in power savings, and more importantly, alleviate interference applied over the communications channel. The platoon server 122 has this platoon data 124 (e.g., the relative location or layout of the vehicle 102 of the platoon) as a major input, along with other factors, when determining which vehicle 102 is to be the PB vehicle 102, as well as a transmit power adjustment.

Figure 6:
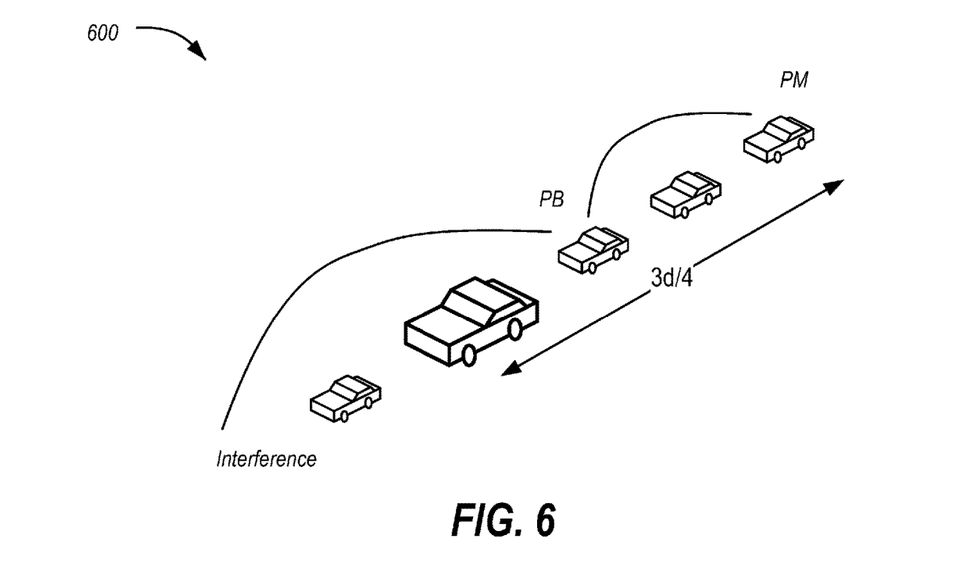
FIG. 6 illustrates an example diagram of a platoon, where a large type of vehicle is acting as the platoon beacon.

FIG. 6 illustrates an example diagram 600 of a platoon, where a large type of vehicle 102 at the second position in the platoon, instead of the one in the middle, is appointed as the PB vehicle 102. This assignment may be performed by the platoon server 122, responsive to consideration of factors such as the transmit range, LOS channel, and interference applied for each of the vehicles 102 of the platoon.

The platoon server 122 may be further configured to recalculate the PB assignment and its power setup. In an example, the recalculation may be performed periodically. In another example, the recalculation may be event triggered, for example, responsive to admission of a new PM to the platoon.

Figure 7:
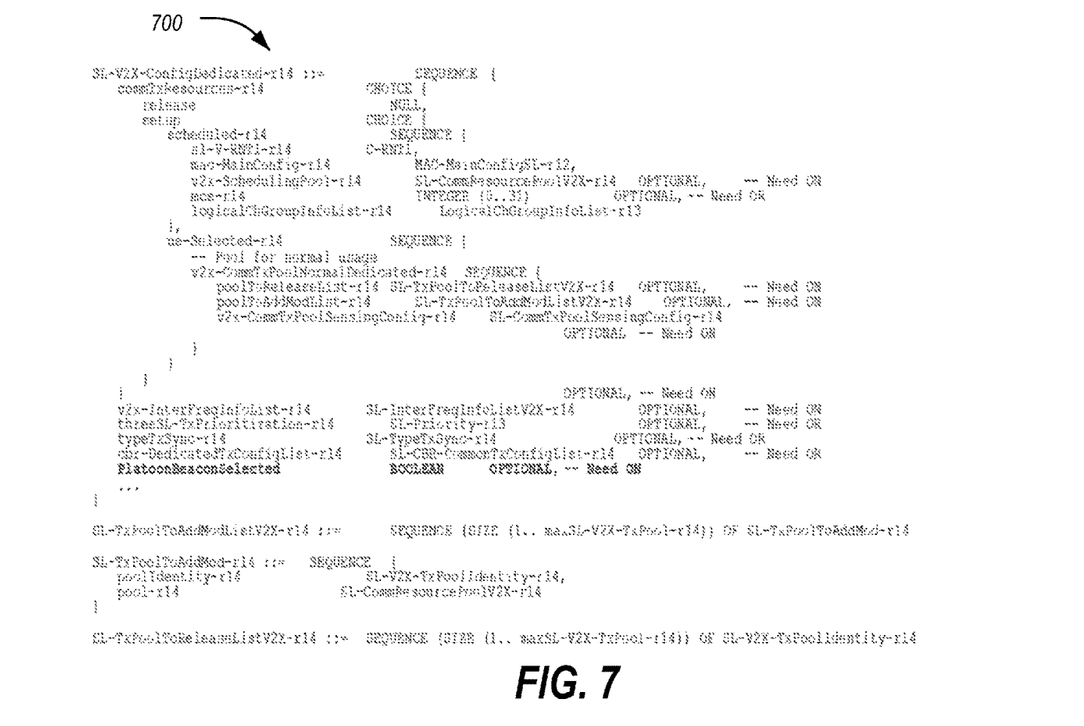
FIG. 7 illustrates a modified SL-V2X-ConfigDedicated information element for use in assigning the platoon beacon of the platoon.

FIG. 7 illustrates a modified SL-V2X-ConfigDedicated information element 700 for use in assigning the PB of the platoon. In general, the SL-V2X-ConfigDedicated information element specifies the dedicated configuration information for V2X sidelink communications. In the modified element 700, a Boolean parameter PlatoonBeaconSelected is added to the SL-V2X-ConfigDedicated structure to notify the selected PB vehicle 102 that it has been selected by the platoon server 122 as being the PB. Further information about the SL-V2X-ConfigDedicated may be found in 3GPP Technical Specification (TS) 36.331, titled "Evolved Universal Terrestrial Radio Access (E-UTRA); Radio Resource Control (RRC); Protocol Specification," which is incorporated herein by reference in in its entirety.

Accordingly, the disclosed systems and methods lead to better resource allocation and interference coordination among platoons and surrounding vehicles 102. This is done by imposing a power control mechanism to the C-V2X system with a centralized platoon controller (i.e., the platoon server 122) such that a more efficient interference mitigation is achieved and congestion control is better addressed with a high density of vehicles 102. The described systems and methods accordingly provide for a dynamically-appointed PB vehicle 102 which is optimally selected based on power/interference and other criteria (such as vehicle type/size (LoS blockage), vehicle capability, and planned route). Heterogeneous vehicles are allowed to form the platoon, while vehicle type/size is one criterion to feed back to central controller when a platooning request is submitted. The disclosed systems and methods accordingly reduce the transmit power, achieve a better signal reliability for CAM exchange, and lowers the interference level provided from a platoon to surrounding vehicles 102. This contributes to better latency and signal performance of CAM, and therefore leads to a smaller intervehicle spacing and larger platoon size, which is especially beneficial in a congested traffic scenario.

Computing devices described herein, such as the controllers 104, TCU 108, and platoon server 122, generally include computer-executable instructions where the instructions may be executable by one or more computing devices such as those listed above. Computer-executable instructions, such as those of the platooning application 120 and the platoon management application 126, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a platoon server in communication with a plurality of vehicles, programmed to:
   receive a platoon request from a platoon candidate vehicle, the request including platoon data indicative of size, transmit power, and location of the candidate vehicle,
   responsive to receipt of the platoon request, send an add message to a member of the platoon that is platoon beacon requesting the candidate vehicle be added to the platoon,
   receive, from the platoon beacon responsive to the add message, an add response acknowledging acceptance by the platoon beacon of addition of the candidate vehicle to the platoon,
   send a join message to the candidate vehicle to admit the candidate vehicle to the platoon responsive to receipt of the add response,
   admit the candidate vehicle to be a member vehicle of the platoon, and
   update which member vehicle of the platoon is the platoon beacon based upon platoon data of each member vehicle of the platoon.

2. The system of claim 1, wherein the candidate vehicle is programmed to join the platoon responsive to receipt of the join message.

3. The system of claim 1, wherein communication between the platoon server and the platoon candidate is performed over a Uu interface, and communication between the platoon server and the platoon beacon is performed over a PC5 interface.

4. The system of claim 1, wherein the platoon server is further programmed to periodically update which vehicle of the platoon is platoon beacon based upon platoon data of each member vehicle of the platoon.

5. The system of claim 1, wherein the platoon beacon is further programmed to periodically broadcast Cooperative Awareness Messages (CAMs) to each member vehicle of the platoon.

6. The system of claim 1, wherein the platoon server is further programmed to choose the platoon beacon as being the member vehicle of the platoon having a location closest to a geographic center of the platoon.

7. The system of claim 1, wherein the platoon server is further programmed to choose the platoon beacon as being the member vehicle of the platoon having a largest vehicle size.

8. A system, comprising:
   a platoon server in communication with a plurality of vehicles, programmed to
   receive a platoon request from a platoon candidate vehicle, the request including platoon data indicative of size, transmit power, and location of the candidate vehicle,
   admit the candidate vehicle to be a member vehicle of the platoon,
   update which member vehicle of the platoon is platoon beacon based upon platoon data of each member vehicle of the platoon, and
   indicate a vehicle of the platoon as being the platoon beacon by sending, to the vehicle, a configuration message specifying configuration information for V2X sidelink communications for the platoon, the configuration message including a flag specifying the vehicle as being selected to be platoon beacon.

9. The system of claim 8, wherein the configuration message is a SL-V2X-ConfigDedicated information element.

10. A method for a vehicle comprising:
    sending, to a platoon server managing a platoon, a platoon request including platoon data specifying size, transmit power, and location of the vehicle, the platoon server sending an add message to a member of the platoon that is platoon beacon requesting the candidate vehicle be added to the platoon, receiving, from the platoon beacon responsive to the add message, an add response acknowledging acceptance by the platoon beacon of addition of the candidate vehicle to the platoon, and sending a join message specifying a platoon beacon of the platoon;
    receiving the join message from the server, the platoon beacon being recalculated by the server responsive to the platoon request; and
    responsive to receiving the join message, sending a message to the platoon beacon requesting admission to the platoon.

11. The method of claim 10, further comprising receiving, from the platoon beacon, periodically broadcast Cooperative Awareness Messages (CAMs).

12. The method of claim 10, further comprising:
    receiving, from the platoon server, a message indicating that the vehicle is now the platoon beacon; and
    sending, from the vehicle designated as platoon beacon, periodic broadcast Cooperative Awareness Messages (CAMs).

13. The method of claim 10, further comprising:
- receiving, from a base station serving the vehicle, a message indicating that the vehicle is the platoon beacon as identified by the base station; and
- sending, from the vehicle designated as platoon beacon, periodic broadcast Cooperative Awareness Messages (CAMs).

14. The method of claim 10, further comprising choosing the platoon beacon as one or more of being a member vehicle of the platoon having a location closest to a geographic center of the platoon or being a member vehicle of the platoon having a largest vehicle size.

15. A non-transitory computer-readable medium comprising instructions that, when executed by a platoon server, cause the platoon server to:
- receive a platoon request from a platoon candidate vehicle, the request including platoon data indicative of size, transmit power, and location of the candidate vehicle;
- responsive to receipt of the platoon request, send an add message to a member of the platoon that is platoon beacon requesting the candidate vehicle be added to the platoon;
- receive, from the platoon beacon responsive to the add message, an add response acknowledging acceptance by the platoon beacon of addition of the candidate vehicle to the platoon;
- send a join message to the candidate vehicle to admit the candidate vehicle to the platoon responsive to receipt of the add response;
- admit the candidate vehicle to be a member vehicle of the platoon; and
- update which member vehicle of the platoon is the platoon beacon based upon platoon data of each member vehicle of the platoon.

16. The medium of claim 15, wherein communication between the platoon server and the platoon candidate is performed over a Uu interface, and communication between each of the member vehicles and the platoon beacon is performed over a PC5 interface.

17. The medium of claim 15, further comprising instructions that, when executed by the platoon server, cause the platoon server to periodically update which vehicle of the platoon is platoon beacon based upon platoon data of each member vehicle of the platoon.

18. The medium of claim 15, further comprising instructions that, when executed by the platoon server, cause the platoon server to one or more of:
- choose the platoon beacon as being the member vehicle of the platoon having a location closet to a geographic center of the platoon; or
- choose the platoon beacon as being the member vehicle of the platoon having a largest vehicle size.

\* \* \* \* \*